(12) United States Patent
Roddy et al.

(10) Patent No.: US 7,204,310 B1
(45) Date of Patent: Apr. 17, 2007

US007204310B1

(54) METHODS OF USE SETTABLE DRILLING FLUIDS COMPRISING CEMENT KILN DUST

(75) Inventors: Craig W. Roddy, Duncan, OK (US); Jiten Chatterji, Duncan, OK (US); D. Chad Brenneis, Marlow, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/403,032

(22) Filed: Apr. 11, 2006

(51) Int. Cl.
*E21B 21/00* (2006.01)
*E21B 33/13* (2006.01)
*E21B 33/14* (2006.01)
*C09K 7/02* (2006.01)
*C09K 7/04* (2006.01)

(52) U.S. Cl. ............... 166/293; 166/292; 175/64; 175/65; 106/707; 106/716; 507/120; 507/140; 507/904

(58) Field of Classification Search ................ 166/292, 166/293; 175/64, 65, 72; 106/707, 716, 106/751, 819; 507/120, 140, 904
See application file for complete search history.

(56) References Cited

U.S. PATENT DOCUMENTS

| | | | |
|---|---|---|---|
| 2,329,940 A | 9/1943 | Ponzer | |
| 2,842,205 A | 7/1958 | Allen et al. | |
| 2,871,133 A | 1/1959 | Palonen et al. | |
| 2,945,769 A | 7/1960 | Gama et al. | |
| 3,168,139 A | 2/1965 | Kennedy et al. | |
| 3,454,095 A | 7/1969 | Messenger et al. | |
| 3,499,491 A | 3/1970 | Wyant et al. | |
| 3,557,876 A | 1/1971 | Tragesser | |
| 3,748,159 A | 7/1973 | George | |
| 3,887,009 A | 6/1975 | Miller et al. | |
| 3,887,385 A | 6/1975 | Quist et al. | |
| 4,018,617 A | 4/1977 | Nicholson | |
| 4,031,184 A | 6/1977 | McCord | |
| 4,176,720 A | 12/1979 | Wilson | |
| 4,268,316 A | 5/1981 | Wills, Jr. | |
| 4,341,562 A | 7/1982 | Ahlbeck | |
| RE31,190 E | 3/1983 | Detroit et al. | |
| 4,407,677 A | 10/1983 | Wills, Jr. | |
| 4,432,800 A | 2/1984 | Kneller et al. | |
| 4,435,216 A | 3/1984 | Diehl et al. | |
| 4,460,292 A * | 7/1984 | Durham et al. ............. 588/252 |
| 4,515,635 A | 5/1985 | Rao et al. | |
| 4,519,452 A | 5/1985 | Tsao et al. | |
| 4,555,269 A | 11/1985 | Rao et al. | |
| 4,614,599 A | 9/1986 | Walker | |
| 4,676,317 A | 6/1987 | Fry et al. | |
| 4,741,782 A | 5/1988 | Styron | |
| 4,784,223 A | 11/1988 | Worrall et al. | |
| 4,883,125 A | 11/1989 | Wilson et al. | |
| 4,941,536 A | 7/1990 | Brothers et al. | |
| 4,992,102 A | 2/1991 | Barbour | |
| 5,049,288 A | 9/1991 | Brothers et al. | |
| 5,058,679 A | 10/1991 | Hale et al. | |
| RE33,747 E | 11/1991 | Hartley et al. | |
| 5,086,850 A | 2/1992 | Harris et al. | |
| 5,121,795 A | 6/1992 | Ewert et al. | |
| 5,123,487 A | 6/1992 | Harris et al. | |
| 5,125,455 A | 6/1992 | Harris et al. | |
| 5,127,473 A | 7/1992 | Harris et al. | |
| 5,213,160 A | 5/1993 | Nahm et al. | |
| 5,238,064 A | 8/1993 | Dahl et al. | |
| 5,266,111 A | 11/1993 | Barbour | |
| 5,295,543 A | 3/1994 | Terry et al. | |
| 5,305,831 A | 4/1994 | Nahm | |
| 5,314,022 A | 5/1994 | Cowan et al. | |
| 5,327,968 A | 7/1994 | Onan et al. | |
| 5,337,824 A | 8/1994 | Cowan | |
| 5,358,044 A | 10/1994 | Hale et al. | |
| 5,358,049 A | 10/1994 | Hale et al. | |
| 5,361,841 A | 11/1994 | Hale et al. | |

(Continued)

FOREIGN PATENT DOCUMENTS

| | | |
|---|---|---|
| CA | 2153372 | 9/1996 |
| GB | 1469954 | 4/1977 |
| JP | 52117316 A | 1/1977 |
| JP | 10110487 | 4/1998 |
| RU | 1373781 | 2/1988 |
| WO | WO 83/01443 | 4/1983 |
| WO | WO 98/54108 | 12/1998 |
| WO | WO 03/031364 A1 | 4/2003 |

OTHER PUBLICATIONS

Halliburton brochure entiteld "Halad®-23 Fluid-Loss Additive" dated 2000.

(Continued)

*Primary Examiner*—George Suchfield
(74) *Attorney, Agent, or Firm*—Craig W. Roddy; Fletcher Yoder

(57) ABSTRACT

Settable drilling fluids comprising an aqueous-based drilling fluid and cement kiln dust. Methods of cementing in a subterranean formation comprising: providing a settable drilling fluid comprising an aqueous-based drilling fluid and cement kiln dust, introducing the settable drilling fluid into a subterranean formation, and allowing the settable drilling fluid to set in the subterranean formation. Methods of converting an aqueous-based drilling fluid to a settable drilling fluid comprising: providing the aqueous-based drilling fluid, and adding cement kiln dust to the aqueous-based drilling fluid to form the settable drilling fluid. Methods of drilling a well bore and cementing a well bore comprising: drilling a well bore, circulating an aqueous-based drilling fluid in the well bore during the step of drilling the well bore, adding cement kiln dust to the aqueous-based drilling fluid to form a settable drilling fluid, and allowing the settable drilling fluid to set in the well bore.

35 Claims, No Drawings

U.S. PATENT DOCUMENTS

| | | |
|---|---|---|
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,423,379 A | 6/1995 | Hale et al. |
| 5,439,056 A | 8/1995 | Cowan |
| 5,458,195 A | 10/1995 | Totten et al. |
| 5,464,060 A | 11/1995 | Hale et al. |
| 5,473,051 A | 12/1995 | Brothers et al. |
| 5,476,144 A | 12/1995 | Nahm et al. |
| 5,494,513 A | 2/1996 | Ding et al. |
| 5,499,677 A | 3/1996 | Cowan |
| 5,515,921 A | 5/1996 | Cowan et al. |
| 5,518,996 A | 5/1996 | Marpy et al. |
| 5,520,730 A | 5/1996 | Barbour et al. |
| 5,529,624 A | 6/1996 | Riegler |
| 5,536,311 A | 7/1996 | Rodrigues |
| 5,569,324 A | 10/1996 | Totten et al. |
| 5,580,379 A | 12/1996 | Cowan |
| 5,585,333 A | 12/1996 | Dahl et al. |
| 5,588,489 A | 12/1996 | Chatterji et al. |
| 5,673,753 A | 10/1997 | Hale et al. |
| 5,711,383 A | 1/1998 | Terry et al. |
| 5,716,910 A | 2/1998 | Totten et al. |
| 5,728,654 A * | 3/1998 | Dobson et al. ............. 507/272 |
| 5,851,960 A | 12/1998 | Totten et al. |
| 5,866,516 A | 2/1999 | Costin |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,060,434 A | 5/2000 | Sweatman et al. |
| 6,060,535 A | 5/2000 | Villar et al. |
| 6,063,738 A | 5/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,312,515 B1 | 11/2001 | Barlet-Gouedard et al. |
| 6,315,042 B1 | 11/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,457,524 B1 | 10/2002 | Roddy |
| 6,478,869 B2 | 11/2002 | Reddy et al. |
| 6,488,763 B2 | 12/2002 | Brothers et al. |
| 6,494,951 B1 | 12/2002 | Reddy et al. |
| 6,508,305 B1 | 1/2003 | Brannon et al. |
| 6,524,384 B2 | 2/2003 | Griffith |
| 6,547,871 B2 | 4/2003 | Chatterji et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,610,139 B2 | 8/2003 | Reddy et al. |
| 6,626,243 B1 | 9/2003 | Boncan |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 * | 3/2004 | Polston ........................ 106/285 |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,835,243 B2 | 12/2004 | Brothers et al. |
| 6,837,316 B2 | 1/2005 | Reddy et al. |
| 6,846,357 B2 | 1/2005 | Reddy et al. |
| 6,848,519 B2 | 2/2005 | Reddy et al. |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,077,203 B1 | 7/2006 | Roddy et al. |
| 2002/0033121 A1 | 3/2002 | Marko |
| 2002/0073897 A1 | 6/2002 | Trato ........................... 106/638 |
| 2002/0117090 A1 | 8/2002 | Ku |
| 2003/0116887 A1* | 6/2003 | Scott ........................... 264/333 |
| 2003/0167970 A1* | 9/2003 | Polston ................... 106/281.1 |
| 2004/0007162 A1 | 1/2004 | Morioka et al. |
| 2004/0040475 A1 | 3/2004 | De La Roij |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0187740 A1 | 9/2004 | Timmons |
| 2004/0188091 A1 | 9/2004 | Luke et al. |
| 2004/0188092 A1 | 9/2004 | Santra et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0072599 A1 | 4/2005 | Luke et al. |
| 2006/0025312 A1 | 2/2006 | Santra et al. |
| 2006/0162926 A1 | 7/2006 | Roddy ........................ 166/278 |

OTHER PUBLICATIONS

Halliburton brochure entiteld "Halad®-344 Fluid Loss Additive" dated 1998.

Halliburton brochure entitled "Halad®-413 Fluid-Loss Additive" dated 1998.

Halliburton brochure entitled "HR®-4 Cement Retarder" dated 1999.

Halliburton brochure entitled "HR®-5 Cement Additive" dated 1998.

Halliburton brochure entitled "HR®-7 Cement Retarder" dated 1999.

Halliburton brochure entitled HR®-12 Cement Retarder dated 1999.

Halliburton brochure entitled HR®-15 Cement Retarder dated 1999.

Halliburton brochure entitled "HR®-25 Cement Retarder" dated 1999.

Halliburton brochure entitled "SCR-100 Cement Retarder" dated 1999.

Halliburton brochure entitled "SCR-100 Cement Retarder—A Valuable Time Saver" dated 1994.

Halliburton brochure entitled "SCR-500L™ High-Temperature Retarder" dated 2000.

Halliburton brochure entitled "AQF-2 Foaming Agent" dated 1999.

Halliburton brochure entitled "Howco-Suds Surfactant" dated 1999.

Halliburton brochure entitled "Pozmix® A Cement Additive" dated 1999.
Halliburton brochure entitled "Pozmix Cement & Pozmix 140" undated.
University of Maine, "Beneficial Use of Solid Waste in Maine" printed from the internet Apr. 14, 2005.
Smith, Dwight K., "Cementing" dated 1980, p. 38.
Parsons, R.L. et al., "Use of Cement Kiln Dust for the Stabilization of Soils" printed from the internet on Apr. 14, 2005.
Paper entitled "Kiln Dusts" printed from the internet on Apr. 14, 2005.
Paper entitled "Standards for the Management of Cement Kiln Dust Waste" printed from the internet Apr. 14, 2005.
Sersale, R. et al., "Portland-Zeolite-Cement For Minimizing Alkali-Aggregate Expansion" dated 1987.
Marfil,S.A. et al., "Zeolite Crystallization in Portland Cement Concrete Due to Alkali-Aggregate Reaction" dated 1993.
Janotka, I., "The Properties of Mortar Using Blends With Portland Cement Clinker, Zeolite Tuff and Gypsum" dated 1995.
Atkins, M. et al., "Zeolite P In Cements" Its Potential For Immobilizing Toxic and Radioactive Waste Species dated 1995.
Rogers, B.A. et al., "Designing a Remedial Acid Treatment for Gulf of Mexico Deepwater Turbidite Sands Containing Zeolite Cement" dated 1998.
Janotka, I. et al., "Effect of Bentonite and Zeolite on Durability of Cement Suspension under Sulfate Attack" dated 1998.
Naiqian, Feng et al., "Study on the suppression effect of natural zeolite on expansion of concrete due to alkali-aggregate reaction" dated 1998.
Chan, Sammy et al., "Comparative study of the initial surface absorption and chloride diffusion of high performance zeolite, silicia fume and PFA concretes" dated 1999.
Ding, Jian-Tong et al., "Extreme vertices design of concrete with combined mineral admixtures" dated 1999.
Poon, C.S. et al., "A study on the hydration of natural zeolite blended cement pastes" dated 1999.
Feng, N.-Q et al., "Zeolite ceramiste cellular concrete" dated 2000.
Bartlet-Gouedard, V. et al., "A Non-Conventional Way of Developing Cement Slurry for Geothermal Wells" dated 2001.
Smith, Dwight "Cementing" Society of Petroleum Engineers, pp. 14, 38.
Office action from U.S. Appl. No. 11/223,671, filed Dec. 15, 2005.
Office action from U.S. Appl. No. 11/271,431, filed Mar. 6, 2006.
Roddy, C. et al., "Methods of Using Settable Compositions Comprising Cement Kiln Dust" U.S. Appl. No. 11/223.671, filed Sep. 9, 2005
Roddy, C. et al., "Methods of Using Foamed Settable Compositions Comprising Cement Kiln Dust" U.S. Appl. No. 11/223,485, filed Sep. 9, 2005.

Roddy, C. et al., "Foamed Settable Compositions Comprising Cement Kiln Dust," U.S. Appl. No. 11/223,703, filed Sep. 9, 2005.
Roddy, C. et al., "Methods of Using Settable Compositions Comprising Cement Kiln Dust and Additive(s)" U.S. Appl. No. 11/223,750, filed Sep. 9, 2005.
Roddy, C. et al., "Settable Compositions Cement Kiln Dust and Additive(s)" U.S. Appl. No. 11/223,669, filed Sep. 9, 2005.
Roddy, C. et al., "Methods of Using Cement Compositions Comprising High Alumina Cement and Cement Kiln Dust" U.S. Appl. No. 11/257,261, filed Oct. 24, 2005.
Roddy, C. et al., "Cement Compositions Comprising High Alumina Cement and Cement Kiln Dust" U.S. Appl. No. 11/256,824, filed Oct. 24, 20005.
Roddy, C. et al., "Methods of Using Settable Compositions Comprising Cement Kiln Dust" U.S. Appl. No. 11/271,690, filed Nov. 10, 2005.
Roddy, C. et al., "Settable Spotting Compositions Comprising Cement Kiln Dust" U.S. Appl. No. 11/271,431, filed Nov. 10, 2005.
Office action from U.S. Appl. No. 11/223,671, filed Mar. 31, 2006.
Roddy, C. et al., "Settable Drilling Fluids Comprising Cement Kiln Dust" U.S. Appl. No. 11/402,741, filed Apr. 11, 2006.
Roddy, C. et al., "Methods of Using Lightweight Settable Compositions Comprising Cement Kiln Dust" U.S. Appl. No. 11/416,563 filed May 3, 2006.
Roddy, C. et al., "Lightweight Settable Compositions Comprising Cement Kiln Dust" U.S. Appl. No. 11/416,754 filed May 3, 2006.
Office action from application U.S. Appl. No. 11/271,431 filed May 17, 2006.
Roddy, C. et al., "Methods of Using Settable Compositions Comprising Cement Kiln Dust" U.S. Appl. No. 11/440,627 filed May 25, 2006.
Herndon, J. et al., "Setting Downhole Plugs: A State-of-the-Art" Petroleum Engineer International, Apr. 1978.
txi® Material Safety Data Sheet for PRESSUR-SEAL.
Roddy, C. et al., "Cementing Compositions Comprising Cement Kiln Dust, Vitrified Shale, Zeolite, And/Or Amorphous Silica Utilizing. . ." U.S. Appl. No. 11/484,951 filed Jul. 12, 2006.
Office action dated Jul. 11, 2006 from U.S. Appl. No. 11/271,431.
Office action dated Jul. 21, 2006 from U.S. Appl. No. 11/416,563.
Office action dated Aug. 15, 2006 from U.S. Appl. No. 11,271,431.
Office action dated Aug. 21, 2006 from U.S. Appl. No. 11/440,627.
Office action dated Oct. 19, 2006 from U.S. Appl. No. 11/402,741.
Foreign communication from a related counterpart application dated Oct. 27, 2006.

* cited by examiner

METHODS OF USE SETTABLE DRILLING FLUIDS COMPRISING CEMENT KILN DUST

CROSS-REFERENCE TO RELATED APPLICATIONS

The present invention is related to U.S. patent application Ser. No. 11/402,741, entitled "Settable Drilling Fluids Comprising Cement Kiln Dust," filed on Apr. 11, 2006 the entire disclosure of which is incorporated herein by reference.

BACKGROUND

The present invention relates to subterranean operations and, more particularly, to settable drilling fluids that comprise an aqueous-based drilling fluid and cement kiln dust ("CKD"), and associated methods of use in subterranean operations.

During the drilling of a well bore in a subterranean formation, a drilling fluid may be used to, among other things, cool the drill bit, lubricate the rotating drill string to prevent it from sticking to the walls of the well bore, prevent blowouts by serving as a hydrostatic head to counteract the sudden entrance into the well bore of high pressure formation fluids, and remove drill cuttings from the well bore. A drilling fluid may be circulated downwardly through a drill pipe and drill bit and then upwardly through the well bore to the surface. A variety of drilling fluids may be used during the drilling of well bores into a subterranean formation. For instance, the drilling fluid used may be any number of fluids (gaseous or liquid) and mixtures of fluids and solids (such as solid suspensions, mixtures, and emulsions).

Once the well bore has been drilled to a desired depth, the drill string and drill bit may be removed from the well bore and the drilling fluid may be left in the well bore to provide hydrostatic pressure on the formation penetrated by the well bore, e.g., to prevent the flow of formation fluids into the well bore. Next, a pipe string (e.g., casing, liners, etc.) may be introduced into the well bore. Depending on the depth of the well bore and whether or not any problems are encountered in introducing the pipe string into the well bore, the drilling fluid may remain relatively static in the well bore for a relatively long time period, for example, up to 24 hours or longer. While drilling fluids are not settable (e.g., they generally do not to form a hardened mass over time), drilling fluids may increase in gel strength over time. As referred to herein, "gel strength" is the measure of the ability of a colloidal dispersion to form a gel and is based upon its resistance to shear. Accordingly, during the time period that the drilling fluid is static in the well bore, portions of the drilling fluid may increase in gel strength so that displacement of the drilling fluid from within the well bore may become more difficult.

After the pipe string has been introduced into the well bore, the pipe string may be cemented in the well bore by pumping a cement composition into an annular space between the walls of the well bore and the pipe string disposed therein, thereby displacing the drilling fluid in the annulus. However, if the drilling fluid has developed sufficient gel strength due to remaining static in the well bore, portions of the drilling fluid in the annulus may not be displaced. Since the drilling fluid generally is not settable, this may be problematic. For example, because the drilling fluid may remain on the surfaces of the subterranean formation and on the surfaces of the pipe string, a suitable bond between the cement composition and the surfaces may not result. This may lead to the loss of zonal isolation, which can result in formation fluids continuing to enter and flow in the well bore.

In order to solve the above-described problem, settable drilling fluids have been used heretofore. Generally, a settable drilling fluid should be formulated so that it is compatible with drilling fluid (if any) remaining in the well bore. In some instances, the settable drilling may be formulated using at least a portion of the drilling fluid that was used in the drilling of the well bore. Because the settable drilling fluid should be compatible with any fluids remaining in the well bore, use of a settable drilling fluid in subsequent cement operations (e.g., primary cementing) may reduce the problems associated with incompatibility between a cement composition and the drilling fluid remaining in the well bore. Additionally, use of a settable drilling fluid may alleviate problems associated with disposal of the used drilling fluid.

During the manufacture of cement, a waste material commonly referred to as "CKD" is generated. "CKD," as that term is used herein, refers to a partially calcined kiln feed that is typically removed from the gas stream and collected during the manufacture of cement. Usually, large quantities of CKD are collected in the production of cement, and they are commonly disposed of as waste. Disposal of the waste CKD can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$.

SUMMARY

The present invention relates to subterranean operations and, more particularly, to settable drilling fluids comprising an aqueous-based drilling fluid and CKD, and associated methods of use in subterranean operations.

An embodiment of the present invention provides a method of cementing that comprises providing a settable drilling fluid comprising an aqueous-based drilling fluid and cement kiln dust, introducing the settable drilling fluid into a subterranean formation, and allowing the settable drilling fluid to set in the subterranean formation.

Another embodiment of the present invention provides a method of converting an aqueous-based drilling fluid to a settable drilling fluid that comprises providing the aqueous-based drilling fluid, and adding cement kiln dust to the aqueous-based drilling fluid to form the settable drilling fluid.

Another embodiment of the present invention provides a method of drilling a well bore and cementing a well bore that comprises drilling a well bore, circulating an aqueous-based drilling fluid in the well bore during the step of drilling the well bore, adding cement kiln dust to the aqueous-based drilling fluid to form a settable drilling fluid, and allowing the settable drilling fluid to set in the well bore.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to subterranean operations and, more particularly, to settable drilling fluids comprising an aqueous-based drilling fluid and CKD, and associated methods of use in subterranean operations.

I. Example Settable Drilling Fluids of the Present Invention

The present invention provides a settable drilling fluid comprising an aqueous-based drilling fluid and CKD. These settable drilling fluids should be suitable for use in a variety of subterranean cementing operations, including, but not limited to, primary cementing. Generally, the settable drilling fluids of the present invention may be formulated so that it is compatible with the drilling fluid, if any, that remains in the well bore from the drilling operations previously performed in the well bore.

Generally, any aqueous-based drilling fluid suitable for use in drilling operations may be used, provided the drilling fluid, or any components thereof, does not adversely interact with the other components of the settable drilling fluids of the present invention. In some embodiments, the drilling fluid may included at least a portion of the drilling fluid that was used in drilling the well bore. Suitable aqueous-based drilling fluids include any number of fluids that may be used for drilling a well bore. An example of a suitable aqueous drilling fluid comprises an aqueous gel. For viscosification, in some embodiments, suitable aqueous gels may comprise a viscosifier, such as clays (e.g, bentonite, attapulgite, sepeolite, etc.) and polymeric viscosifiers. In some embodiments, suitable aqueous gels may comprise a weighting material (e.g., barium sulfate). In some embodiments, suitable aqueous gels may comprise calcium oxide (e.g., lime muds) and/or partially hydrolyzed polyacrylamide ("PHPA") (e.g., PHPA muds). Additionally, suitable aqueous drilling fluids further may comprise any of a variety of suitable additives, including, but not limited to, thinners, filtration control agents, polymeric viscosifiers, caustic soda, salts (e.g., sodium chloride), and combinations thereof.

In some embodiments, the aqueous-based drilling fluid may be present in the settable drilling fluids of the present invention in an amount in the range of from about 5% to about 80% by weight of the settable drilling fluid. In some embodiments, the drilling fluid may be present in the settable drilling fluids of the present invention in an amount in the range of from about 5% to about 40% by weight of the settable drilling fluid. In some embodiments, the drilling fluid may be present in the settable drilling fluids of the present invention in an amount in the range of from about 10% to about 30% by weight of the settable drilling fluid. One of ordinary skill in the art will be able to determine, with the benefit of this disclosure, the appropriate amount of the drilling fluid present in the settable drilling fluids of the present invention based on a number of factors, including the desired compressive strength, downhole temperature, formation permeability, formation porosity, setting of the mud filter cake, and rheology of the fluid.

The CKD should be included in the settable drilling fluid of the present invention in an amount sufficient, among other things, to provide the desired compressive strength for a particular application. In some embodiments, the CKD may be present in the settable drilling fluids of the present invention in an amount in the range of about 5% to 30% by weight of the settable drilling fluid. In some embodiments, the CKD may be present in the settable drilling fluids of the present invention in an amount in the range of from about 5% to 20% by weight of the settable drilling fluid. In some embodiments, the CKD may be present in the settable drilling fluids of the present invention in an amount in the range of from about 5% to 15% by weight of the settable drilling fluid.

In some embodiments, the settable drilling fluids of the present invention optionally further may comprise additional water. The additional water included in the settable drilling fluids of the present invention may include freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may adversely affect other components in the settable composition. In some embodiments, the additional water may be included in the settable drilling fluids of the present invention in an amount in the range of from about 5% to about 40% by weight of the settable drilling fluid. In some embodiments, the additional water may be included in the settable drilling fluids of the present invention in an amount in the range of from about 15% to about 35% by weight of the settable drilling fluid.

Optionally, in some embodiments, the settable drilling fluids of the present invention further may comprise silica fume. Generally, the silica fume may be included in the settable drilling fluids of the present invention in an amount sufficient to provide the desired compressive strength. In some embodiments, the silica fume may be present in the settable drilling fluids of the present invention in an amount in the range of from about 5% to 20% by weight of the settable drilling fluid. In some embodiments, the silica fume may be present in the settable drilling fluids of the present invention in an amount in the range of from about 8% to 15% by weight of the settable drilling fluid.

Optionally, in some embodiments, the settable drilling fluids of the present invention further may comprise a hydraulic cement. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, *API Specification for Materials and Testing for Well Cements*, API Specification 10, Fifth Ed., Jul. 1, 1990.

Where present, the hydraulic cement generally may be included in the settable drilling fluids in an amount sufficient to provide the desired compressive strength, density, and/or cost. In some embodiments, the hydraulic cement may be present in the settable drilling fluids of the present invention in an amount up to about 10% by weight of the settable drilling fluid. In some embodiments, the hydraulic cement may be present in the settable drilling fluids of the present invention in an amount in the range of from 3% to about 7% by weight of the settable drilling fluid.

Optionally, in some embodiments, the settable drilling fluids of the present invention further may comprise vitrified shale. Among other things, the vitrified shale included in the settable compositions may react with excess lime to form a suitable cementing material, for example, calcium silicate hydrate. A variety of vitrified shales are suitable, including those comprising silicon, aluminum, calcium, and/or magnesium. Suitable examples of vitrified shale include, but are not limited to, PRESSUR-SEAL® FINE LCM material and PRESSUR-SEAL® COARSE LCM material, which are commercially available from TXI Energy Services, Inc., Houston, Tex. Generally, the vitrified shale may have any particle size distribution as desired for a particular application. In certain embodiments, the vitrified shale may have a particle size distribution in the range of from about 37 micrometers to about 4,750 micrometers.

Where present, the vitrified shale generally may be included in the settable drilling fluids in an amount sufficient to provide the desired compressive strength, density, and/or cost. In some embodiments, the vitrified shale may be present in the settable drilling fluids of the present invention in an amount up to about 12% by weight of the settable drilling fluid. In some embodiments, the vitrified shale may be present in the settable drilling fluids of the present invention in an amount in the range of from 1% to about 10% by weight of the settable drilling fluid.

Optionally, in some embodiments, the settable drilling fluids of the present invention further may comprise calcium hydroxide (commonly referred to as "hydrated lime"). In some embodiments, the calcium hydroxide may be present in the settable drilling fluids of the present invention in an amount in the range of from about 10% to about 30% by weight of the settable drilling fluid.

Optionally, in some embodiments, the settable drilling fluids of the present invention further may comprise a dispersant. While a variety of dispersants known to those skilled in the art may be used in accordance with the present invention, a suitable dispersant comprises a water-soluble polymer prepared by the condensation of formaldehyde with acetone and sodium bisulfite. Such a dispersant is commercially available as CFR™-3 dispersant from Halliburton Energy Services, Inc., Duncan, Okla. Another suitable dispersant comprises a sodium salt of naphthalene sulfonic acid condensed with formaldehyde, an example of which is commercially available as CFR™-2 dispersant also from Halliburton Energy Services, Inc., Duncan, Okla. Another suitable dispersant comprises gluconic acid, an example of which is commercially available as CFR™-1 dispersant also from Halliburton Energy Services, Inc., Duncan, Okla. In some embodiments, the dispersant may be present in the settable drilling fluids of the present invention in an amount in the range of from about 0.1% to about 5% by weight of the settable drilling fluid.

Optionally, in some embodiments, the settable compositions of the present invention further may comprise a set retarder. As used herein, the term "set retarder" refers to an additive that retards the setting of the settable drilling fluids of the present invention. Examples of suitable set retarding additives include, but are not limited to, ammonium, alkali metals, alkaline earth metals, metal salts of sulfoalkylated lignins, hydroxycarboxy acids, copolymers of 2-acrylamido-2-methylpropane sulfonic acid salt and acrylic acid or maleic acid, and combinations thereof. One example of a suitable sulfoalkylate lignin comprises a sulfomethylated lignin. Suitable set retarding additives are disclosed in more detail in United States Patent No. Re. 31,190, the entire disclosure of which is incorporated herein by reference. Suitable set retarding additives are commercially available from Halliburton Energy Services, Inc. under the tradenames HR® 4, HR® 5, HR® 7, HR® 12, HR® 15, HR® 25, SCR™ 100, and SCR™ 500. Generally, where used, the set retarding additive may be included in the settable compositions of the present invention in an amount sufficient to provide the desired set retardation. In some embodiments, the set retarding additive may be present in an amount in the range of from about 0.1% to about 2% by weight of the settable drilling.

Additionally, those of ordinary skill in the art will recognize a variety of additional additives suitable for inclusion in the settable drilling fluids of the present invention for a particular application. Such additives may include, but are not limited to, accelerators, lost circulation materials, fluid loss control additives, and combinations thereof.

II. Example Methods of the Present Invention

The settable drilling fluids of the present invention may be used in any of a variety of subterranean cementing operations. For example, a settable composition of the present invention that comprises a portion of the drilling fluid used in drilling a well bore may be used in cementing operations in the well bore. While the compositions of the present invention may be used in a variety of cementing operations, they may be particularly suitable for primary cementing operations because the settable drilling fluids of the present invention generally should be compatible with the drilling fluid, if any, remaining in the well bore.

An example of such a cementing operation using the settable drilling fluids of the present invention may comprise providing an aqueous-based drilling fluid, adding CKD to the aqueous-based drilling fluid to form a settable drilling fluid, introducing the settable drilling fluid into a subterranean formation, and allowing the settable drilling fluid to set in the subterranean formation. As will be understood by those of ordinary skill in the art, with the benefit of this disclosure, additional additives, such as those described above, may be added to the settable drilling fluid to impart desired properties thereto. In some embodiments, the settable drilling fluids of the present invention may be used in primary cementing, in that, the cementing embodiments further may comprise introducing a casing into a well bore penetrated by the well bore, wherein the settable drilling fluid sets in an annulus formed between the casing and a wall of the well bore.

In some embodiments, the methods of the present invention further may comprise drilling a well bore while the aqueous-based drilling fluid is circulated in the well bore. At a desired time during the drilling operation (for example, when the well bore, or that portion of the well bore, has been drilled to the desired depth), the aqueous-based drilling fluid may be converted into a settable drilling fluid of the present invention. Converting the aqueous-based drilling fluid into a settable drilling fluid of the present invention generally comprises added CKD to the drilling fluid. In some embodiments, the CKD may be mixed with water to form a settable composition, prior to their addition to the aqueous-based drilling fluid. As will be understood by those of ordinary skill in the art, with the benefit of this disclosure, additional additives, such as those described above, may be added to the aqueous-based drilling fluid to impart desired properties thereto. This settable drilling fluid may then be used in any suitable cementing operation.

To facilitate a better understanding of the present invention, the following examples of certain aspects of some embodiments are given. In no way should the following examples be read to limit, or define, the scope of the invention.

EXAMPLE 1

Three aqueous-based drilling fluids having a density of 10 pounds per gallon were prepared. The first drilling fluid was a bentonite mud. The second drilling fluid was a PHPA mud. The third drilling fluid was a lime mud. The formulation of each drilling fluid is provided in Table 1 below. After preparation, each drilling fluid was stirred on a dispersator for at least 60 minutes. Each of these drilling fluids was mixed with CKD and tested as provided in Examples 2–4.

TABLE 1

Drilling Fluid Formulations

| Formulation | Bentonite Mud | PHPA Mud | Lime Mud |
|---|---|---|---|
| Water, bbl | 0.928 | 0.913 | 0.91 |
| Bentonite Viscosifier,[1] lb | 15 | 10 | 12 |
| Sodium Chloride, lb | — | 35.9 | — |
| Thinner,[2] lb | — | — | 4 |
| Sodium Hydroxide, lb | — | 0.25 | 1.5 |
| Calcium Hydroxide, lb | — | — | 6 |
| Partially Hydrolyzed Polyacrylamide,[3] lb | — | 1 | — |
| Filtration Control Agent,[4] lb | — | 1 | 1 |
| Polymer Viscosifier,[5] lb | — | 0.25 | 0.5 |
| Weighting Material,[6] lb | 75 | 52 | 73 |

[1] Ground Bentonite available as AQUAGEL ® Viscosifier from Halliburton Energy Services, Inc., Duncan, Oklahoma.
[2] A ferrochrome lignosulfonate available as QUIK-THIN ® Thinner from Halliburton Energy Services, Inc., Duncan, Oklahoma.
[3] A granular synthetic polymer containing PHPA copolymer available as EZ MUD DP ® Borehole Stabilizer from Halliburton Energy Services, Inc., Duncan, Oklahoma.
[4] PAC-L ® Modifier Natural Cellulosic Polymer available from Halliburton Energy Services, Inc., Duncan, Oklahoma.
[5] BARAZAN D PLUS ® Viscosifier available from Halliburton Energy Services, Inc., Duncan, Oklahoma.
[6] A ground barium sulfate available as Bariod ® Weighting Material from Halliburton Energy Services, Inc., Duncan, Oklahoma.

EXAMPLE 2

Sample settable compositions (Fluid Nos. 1–2) were prepared. The sample settable compositions comprised water, CKD, silica fume, a dispersant, a set retarder, and calcium hydroxide as shown below in Table 2.

TABLE 2

Sample Settable Composition Comprising CKD

| Composition (grams) | Fluid No. 1 | Fluid No. 2 |
|---|---|---|
| Water | 400 | 400 |
| Class A CKD | 150 | — |
| Class H CKD | — | 150 |
| Silica Fume | 150 | 150 |
| Dispersant[1] | 50 | 40 |
| Set Retarder[2] | 13 | 13 |
| Calcium Hydroxide | 300 | 300 |

[1] CFR ™-3L Dispersant from Halliburton Energy Services, Inc.
[2] HR ™-4L Retarder from Halliburton Energy Services, Inc.

After preparation of the sample settable compositions, to prepare sample settable drilling fluids, the sample settable compositions were mixed with the sample drilling fluids from Example 1 in a volume ratio of sample settable composition to drilling fluid of about 80:20, as shown below in Table 3. Thereafter, the resultant foamed sample compositions were subjected to 72-hour compressive strength tests at the temperature indicated in accordance with API Specification 10. The results of the compressive strength tests are set forth in the table below.

TABLE 3

Compressive Strength of Sample Settable Drilling Fluids

| Settable Composition (80 parts by vol) | Drilling Fluid (20 parts by vol) | Temp. (° F.) | 72 Hr Compressive Strength (psi) |
|---|---|---|---|
| Fluid No. 1 | PHPA Mud | 80 | Not Set |
|  |  | 140 | 284 |
|  |  | 160 | 385 |
| Fluid No. 2 | PHPA Mud | 80 | Not Set |
|  |  | 140 | 328 |
|  |  | 160 | 363 |
| Fluid No. 2 | Bentonite Mud | 80 | 13.49 |
|  |  | 140 | 597 |
|  |  | 160 | 191.7 |
| Fluid No. 2 | Lime Mud | 80 | Not Set |
|  |  | 140 | 488 |
|  |  | 160 | 319 |

EXAMPLE 3

A sample settable composition (Fluid No. 3) was prepared. Fluid No. 3 comprised water, CKD, silica fume, class H Portland cement, a dispersant, a set retarder, and calcium hydroxide as shown below in Table 4.

TABLE 4

Sample Settable Composition Comprising CKD and Portland Cement

| Composition (grams) | Fluid No. 3 |
|---|---|
| Water | 400 |
| Class H CKD | 75 |
| Silica Fume | 150 |
| Class H Portland Cement | 75 |
| Dispersant[1] | 40 |
| Set Retarder[2] | 13 |
| Calcium Hydroxide | 300 |

[1] CFR ™-3L Dispersant from Halliburton Energy Services, Inc.
[2] Hr ™-4L Retarder from Halliburton Energy Services, Inc.

After preparation, to prepare sample settable drilling fluids, Fluid No. 3 was mixed with the sample drilling fluids from Example 1 in a volume ratio of Fluid No. 3 to drilling fluid of about 80:20. Thereafter, the resultant settable drilling fluids were subjected to thickening time and 72-hour compressive strength tests at the temperature indicated in accordance with API Specification 10. The results of the compressive strength tests are set forth in the table below.

TABLE 5

Compressive Strength/Thickening Time of Sample Settable Drilling Fluids

| Settable Composition (80 parts by vol) | Drilling Fluid (20 parts by vol) | Temp. (° F.) | 72 Hr Compressive Strength (psi) | Thickening Time to 70 BC (hr:min) |
|---|---|---|---|---|
| Fluid No. 3 | Lime Mud | 80 | 25 | n/a |
|  |  | 140 | 585 | 6:22 |
|  |  | 160 | 541 | n/a |
| Fluid No. 3 | PHPA Mud | 80 | 15.57 | n/a |
|  |  | 140 | 323 | n/a |
|  |  | 160 | 279 | n/a |
| Fluid No. 3 | Bentonite Mud | 80 | 18.51 | n/a |
|  |  | 140 | 866 | 3:19 |
|  |  | 160 | 699 | n/a |

EXAMPLE 4

A sample settable composition (Fluid No. 4) was prepared. Fluid No. 4 comprised water, CKD, silica fume, vitrified shale, class H Portland cement, a dispersant, a set retarder, and calcium hydroxide as shown below in Table 6.

TABLE 6

Sample Settable Composition Comprising CKD, Portland Cement, and Vitrified Shale

| Composition (grams) | Fluid No. 4 |
| --- | --- |
| Water | 400 |
| Class H CKD | 37.5 |
| Silica Fume | 150 |
| Vitrified Shale | 37.5 |
| Class H Portland Cement | 75 |
| Dispersant[1] | 40 |
| Set Retarder[2] | 13 |
| Calcium Hydroxide | 300 |

[1]CFR ™-3L Dispersant from Halliburton Energy Services, Inc.
[2]HR ™-4L Retarder from Halliburton Energy Services, Inc.

After preparation, to prepare sample settable drilling fluids, Fluid No. 4 was mixed with the sample drilling fluids from Example 1 in a volume ratio of Fluid No. 4 to drilling fluid of about 80:20. Thereafter, the resultant settable drilling fluids were subjected to 72-hour compressive strength tests at the temperature indicated in accordance with API Specification 10. The results of the compressive strength tests are set forth in the table below.

TABLE 7

Compressive Strengths of Sample Settable Drilling Fluid

| Settable Composition (80 parts by vol) | Drilling Fluid (20 parts by vol) | Temp. (° F.) | 72 Hr Compressive Strength (psi) |
| --- | --- | --- | --- |
| Fluid No. 4 | Lime Mud | 80 | 12.47 |
|  |  | 140 | 864 |
|  |  | 160 | 676 |
| Fluid No. 4 | PHPA Mud | 80 | 34.4 |
|  |  | 140 | 744 |
|  |  | 160 | 713 |
| Fluid No. 4 | Bentonite Mud | 80 | 18 |
|  |  | 140 | 676 |
|  |  | 160 | 717 |

These examples thus indicate that settable drilling fluids comprising a drilling fluid and CKD may have suitable thickening times and/or compressive strengths for a particular application.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about c," or, equivalently, "from approximately a to c," or, equivalently, "from approximately a–c") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method of cementing comprising:
   providing a settable drilling fluid comprising an aqueous-based drilling fluid and cement kiln dust;
   introducing the settable drilling fluid into a well bore; and
   allowing the settable drilling fluid to set in the well bore.

2. The method of claim 1 comprising adding the cement kiln dust and water to the aqueous-based drilling fluid to form the settable drilling fluid.

3. The method of claim 1 wherein the cement kiln dust is added to the settable drilling fluid in an amount in the range of from about 1% to about 25% by weight of the settable drilling fluid.

4. The method of claim 1 wherein the aqueous-based drilling fluid is a bentonite mud, a lime mud, a partially hydrolyzed polyacrylamide mud, or combinations thereof.

5. The method of claim 1 wherein the aqueous-based drilling fluid is an aqueous gel comprising a viscosifier selected from the group consisting of a clay, a polymeric viscosifier, and combinations thereof.

6. The method of claim 1 wherein the aqueous-based drilling fluid is present in the settable drilling fluid in an amount in the range of from about 5% to about 40% by weight of the settable drilling fluid.

7. The method of claim 1 wherein the settable drilling fluid comprises at least one additive selected from the group consisting of an accelerator, a lost circulation material, a fluid loss control additive, a dispersant, a set retarder, calcium hydroxide, silica fume, a hydraulic cement, vitrified shale, and combinations thereof.

8. The method of claim 1 wherein the settable drilling fluid comprises silica fume in an amount in the range of from about 5% to about 20% by weight of the settable drilling fluid.

9. The method of claim 1 wherein the settable drilling fluid comprises a hydraulic cement in an amount up to about 10% by weight of the settable drilling fluid.

10. The method of claim 1 wherein the settable drilling fluid comprises vitrified shale in an amount up to about 10% by weight of the settable drilling fluid.

11. The method of claim 1 wherein the settable drilling fluid comprises calcium hydroxide in an amount in the range of from about 10% to about 30% by weight of the settable drilling fluid.

12. A method of converting an aqueous-based drilling fluid to a settable drilling fluid comprising:
    providing an aqueous-based drilling fluid;
    adding cement kiln dust to the aqueous-based drilling fluid to form the settable drilling fluid;
    introducing the settable drilling fluid into a well bore; and
    allowing the settable drilling fluid to set in the well bore.

13. The method of claim 12 further comprising the step of adding additional water to the aqueous-based drilling fluid.

14. The method of claim 12 wherein the aqueous-based drilling fluid is a bentonite mud, a lime mud, a partially hydrolyzed polyacrylamide mud, or combinations thereof.

15. The method of claim 12 wherein the cement kiln dust is added to the aqueous-based drilling fluid in an amount in the range of from about 1% to about 25% by weight of the settable drilling fluid.

16. The method of claim 12 wherein the aqueous-based drilling fluid is present in the settable drilling fluid in an amount in the range of from about 5% to about 40% by weight of the settable drilling fluid.

17. The method of claim 12 further comprising the step of adding at least one additive to the aqueous-based drilling fluid, the at least one additive selected from the group consisting of an accelerator, a lost circulation material, a fluid loss control additive, a dispersant, a set retarder, calcium hydroxide, silica fume, a hydraulic cement, vitrified shale, and combinations thereof.

18. A method of drilling a well bore and cementing a well bore comprising:
 drilling a well bore;
 circulating an aqueous-based drilling fluid in the well bore during the step of drilling the well bore;
 adding cement kiln dust to the aqueous-based drilling fluid to form a settable drilling fluid; and
 allowing the settable drilling fluid to set in the well bore.

19. The method of claim 18 further comprising the step of adding additional water to the aqueous-based drilling fluid.

20. The method of claim 18 wherein the aqueous-based drilling fluid is a bentonite mud, a lime mud, a partially hydrolyzed polyacrylamide mud, or combinations thereof.

21. The method of claim 18 wherein the cement kiln dust is added to the aqueous-based drilling fluid in an amount in the range of from about 1% to about 25% by weight of the settable drilling fluid.

22. The method of claim 18 wherein the aqueous-based drilling fluid is present in the settable drilling fluid in an amount in the range of from about 5% to about 40% by weight of the settable drilling fluid.

23. The method of claim 18 further comprising the step of adding at least one additive to the aqueous-based drilling fluid, the at least one additive selected from the group consisting of an accelerator, a lost circulation material, a fluid loss control additive, a dispersant, a set retarder, calcium hydroxide, silica fume, a hydraulic cement, vitrified shale, and combinations thereof.

24. The method of claim 12 comprising using the aqueous-based drilling fluid for drilling in a subterranean formation, prior to the adding the cement kiln dust to the aqueous-based drilling fluid.

25. A method of cementing comprising:
 providing a settable drilling fluid comprising an aqueous-based drilling fluid and cement kiln dust;
 introducing the settable drilling fluid into a subterranean formation; and
 allowing the settable drilling fluid to set in an annulus between the subterranean formation and a pipe string located in the subterranean formation.

26. The method of claim 25 comprising adding the cement kiln dust and water to the aqueous-based drilling fluid to form the settable drilling fluid.

27. The method of claim 25 wherein the cement kiln dust is added to the settable drilling fluid in an amount in the range of from about 1% to about 25% by weight of the settable drilling fluid.

28. The method of claim 25 wherein the aqueous-based drilling fluid is a bentonite mud, a lime mud, a partially hydrolyzed polyacrylamide mud, or combinations thereof.

29. The method of claim 25 wherein the aqueous-based drilling fluid is an aqueous gel comprising a viscosifier selected from the group consisting of a clay, a polymeric viscosifier, and combinations thereof.

30. The method of claim 25 wherein the aqueous-based drilling fluid is present in the settable drilling fluid in an amount in the range of from about 5% to about 40% by weight of the settable drilling fluid.

31. The method of claim 25 wherein the settable drilling fluid comprises at least one additive selected from the group consisting of an accelerator, a lost circulation material, a fluid loss control additive, a dispersant, a set retarder, calcium hydroxide, silica fume, a hydraulic cement, vitrified shale, and combinations thereof.

32. The method of claim 25 wherein the settable drilling fluid comprises silica fume in an amount in the range of from about 5% to about 20% by weight of the settable drilling fluid.

33. The method of claim 25 wherein the settable drilling fluid comprises a hydraulic cement in an amount up to about 10% by weight of the settable drilling fluid.

34. The method of claim 25 wherein the settable drilling fluid comprises vitrified shale in an amount up to about 10% by weight of the settable drilling fluid.

35. The method of claim 25 wherein the settable drilling fluid comprises calcium hydroxide in an amount in the range of from about 10% to about 30% by weight of the settable drilling fluid.

* * * * *